United States Patent
Saito et al.

(10) Patent No.: US 9,238,703 B2
(45) Date of Patent: Jan. 19, 2016

(54) CURABLE COMPOSITION, CURED PRODUCT AND LAMINATE

(75) Inventors: Masato Saito, Saitama (JP); Yukio Kishi, Saitama (JP); Masuo Koyama, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 928 days.

(21) Appl. No.: 12/527,588

(22) PCT Filed: Dec. 2, 2008

(86) PCT No.: PCT/JP2008/071857
§ 371 (c)(1),
(2), (4) Date: Aug. 18, 2009

(87) PCT Pub. No.: WO2009/090803
PCT Pub. Date: Jul. 23, 2009

(65) Prior Publication Data
US 2010/0035053 A1    Feb. 11, 2010

(30) Foreign Application Priority Data
Jan. 15, 2008    (JP) ................................ 2008-006191

(51) Int. Cl.
*C08F 290/06*    (2006.01)
*C08K 5/10*    (2006.01)
*C08K 5/06*    (2006.01)
*C08G 18/38*    (2006.01)
(Continued)

(52) U.S. Cl.
CPC .......... *C08F 290/06* (2013.01); *C08G 18/3853* (2013.01); *C08K 5/06* (2013.01); *C08K 5/10* (2013.01); *C09D 4/00* (2013.01); *G02B 1/105* (2013.01); *Y10T 428/264* (2015.01); *Y10T 428/265* (2015.01)

(58) Field of Classification Search
CPC ........ C08F 290/06; C09D 4/00; G02B 1/105; G02B 27/0006; G08G 18/3853; G08G 18/791
See application file for complete search history.

(56) References Cited

U.S. PATENT DOCUMENTS 6,228,499 B1 *   5/2001  Nakauchi et al. ............. 428/412
7,153,563 B2 *  12/2006  Shoshi et al. ................. 428/220
(Continued)

FOREIGN PATENT DOCUMENTS

| JP | 8-245903 | 9/1996 |
| JP | 10-179641 | 10/1998 |

(Continued)

OTHER PUBLICATIONS

Wang, "Feasibility Study of Quantifying and Discriminating Soybean Oil Adulteration in Camellia Oils by Attenuated Total Reflectance Mior and Fiber Optic Diffuse Reflectance NIR", Food Chemistry 95 (2006), pp. 529-536.*

*Primary Examiner* — Scott R Walshon
(74) *Attorney, Agent, or Firm* — Bacon & Thomas, PLLC

(57) ABSTRACT

A hard coat layer on which adhered fingerprints are inconspicuous is provided. The hard coat layer 1 consists of a cured product. The cured product is formed by curing a curable composition by irradiating it with an ultraviolet ray. The curable composition contains a curable resin. The curable resin contains reactive monomers. The reactive monomers contain an isocyanuric acid derivative. The isocyanuric acid derivative is preferably tri(meth)acrylate of an ethylene oxide and ε-caprolactone adduct of isocyanuric acid.

10 Claims, 1 Drawing Sheet

(51) Int. Cl.
  *G02B 1/10*   (2015.01)
  *C09D 4/00*   (2006.01)

(56) References Cited

U.S. PATENT DOCUMENTS

| | | | |
|---|---|---|---|
| 7,785,713 B2 * | 8/2010 | Odaka et al. | 428/412 |
| 2004/0071974 A1 * | 4/2004 | Shoshi et al. | 428/421 |
| 2005/0142362 A1 * | 6/2005 | Inaoka et al. | 428/411.1 |
| 2007/0298248 A1 | 12/2007 | Hongo et al. | 428/333 |
| 2008/0255297 A1 * | 10/2008 | Itami et al. | 524/547 |

FOREIGN PATENT DOCUMENTS

| | | |
|---|---|---|
| JP | 2004359834 A * | 12/2004 |
| JP | 2007-56128 | 3/2007 |
| JP | 2007-84602 | 4/2007 |
| WO | WO 2007125746 A1 * | 11/2007 |

* cited by examiner

CURABLE COMPOSITION, CURED PRODUCT AND LAMINATE

TECHNICAL FIELD

The present invention relates to a curable composition, a cured product and a laminate.

BACKGROUND ART

A coated layer consisting of a cured coating composition containing a siloxane compound is known (Patent document 1).

Patent document 1: Japanese Patent Unexamined Publication (KOKAI) No. 2006-188557 (Paragraph 0013)

DISCLOSURE OF THE INVENTION

Object to be Achieved by the Invention

However, according to the technique of Patent document 1, strong water repellency and oil repellency are imparted to the coated layer due to the influence of the siloxane compound. Therefore, the coated layer has a problem that when a fingerprint is adhered on the coated layer, the adhered fingerprint is conspicuous on the coated layer surface, and hence appearance of the coated layer is degraded.

An object to be achieved by the present invention is to provide a curable composition which can form a coated film capable of making fingerprints adhered to the film inconspicuous, a cured product of this curable composition, and a laminate comprising such a cured product.

Means for Achieving the Object

The present invention achieves the aforementioned object with the following solutions.

The laminate of the present invention has a hard coat layer. The hard coat layer consists of a cured product. The cured product is obtained by curing a curable composition. The curable composition contains a curable resin. The curable resin contains reactive monomers. The reactive monomers contain an isocyanuric acid derivative. The isocyanuric acid derivative has at least a polymerizable reaction group and an alkylene oxide chain in the molecule.

Effect of the Invention

According to the present invention, even if fingerprints adhere, they can be made inconspicuous. As a result, degradation of appearance can be prevented.

Figure 1:
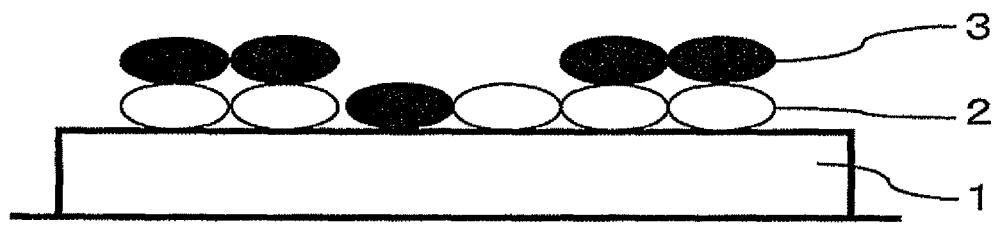
FIG. 1 is a conceptual drawing for explaining surface conditions of a hard coat layer according to the embodiment of the present invention.

DESCRIPTION OF NOTATIONS 1, 1a, 1b . . . Hard coat layer (cured product), 2 . . . aqueous component (fingerprint component), 3 . . . oil component (fingerprint component).

Best Mode for Carrying out the Invention

Hereafter, embodiments of the curable composition, cured product and laminate of the present invention will be explained.

<<Curable composition>>

The curable composition according to this embodiment of the present invention comprises a resin component. In this embodiment, the resin component contains one or both of a thermosetting resin and an ionizing radiation curable resin. To provide superior hardness for the cured file, the resin component preferably contains at least an ionizing radiation curable resin.

The ionizing radiation curable resin is preferably a photopolymerizable monomer and/or a photopolymerizable prepolymer, used independently or in combination, and the ionizing radiation curable resin contains a compound which generates an active radical species upon exposure to of ionizing radiation (light), i.e., an ionizing radiation (photo) polymerization initiator.

In this embodiment, as the photopolymerizable monomer (example of reactive monomer) contained in the ionizing radiation curable resin, at least an isocyanuric acid derivative (A) having a polymerizable reaction group and an alkylene oxide chain in the molecule is used.

Although a case of using a resin component containing an ionizing radiation curable resin and the isocyanuric acid derivative (A) described later as the photopolymerizable monomer as an example of reactive monomer will be explained in this embodiment, a thermosetting resin may be contained in the resin component instead of or in combination with the ionizing radiation curable resin. When a thermosetting resin is contained in the resin component, a thermally polymerizable monomer and prepolymer are used independently or in combination, and a thermal polymerization initiator (D2) described later, i.e., a compound which generates an active radical species upon heating, is added. In this case, the isocyanuric acid derivative (A) described later may be used as the thermally polymerizable monomer.

The inventors of the present invention found that, in order to make fingerprints adhered on a surface of a cured coated film inconspicuous (improvement in invisibility of adhered fingerprints), it was effective to impart appropriate hydrophilicity and lipophilicity to the surface of the coated film, not to impart strong water repellency and oil repellency. Materials of coated film were examined on the basis of the aforementioned finding, and it was found that if the specific isocyanuric acid derivative (A) was used, appropriate hydrophilicity and lipophilicity could be imparted to the surface of cured coated film.

In this embodiment, the cured coated film can be made to exhibit appropriate hydrophilicity and lipophilicity by using photopolymerizable monomers containing the specific isocyanuric acid derivative (A), therefore contact area of fingerprint components (consisting of aqueous component and oil component) with the coated film surface does not become unduly small, and the fingerprint components can be spread on the coated film surface with appropriately wetting the film surface. As a result, even when a fingerprint is adhered on the surface of the cured coated film, the adhered fingerprint can be made inconspicuous (improvement in invisibility of adhered fingerprints). In this embodiment, in addition to such improvement in invisibility of adhered fingerprints, prevention of degradation of the hard coat property of the cured coated film (hardness of coated film) can also be attained. That is, both performances of improvement in invisibility of adhered fingerprints and prevention of degradation of the hard coat property can be achieved with good balance of them.

Moreover, the inventors of the present invention also found that if the specific isocyanuric acid derivative (A) was used, wiping-off property for adhered fingerprints was made favorable, and fingerprint components remaining even after wiping could also be made inconspicuous, besides that the effects of the improvement in invisibility of adhered fingerprints and the prevention of degradation of the hard coat property were provided.

In this embodiment, type of the polymerizable reaction group contained in the molecule of the isocyanuric acid derivative (A) is not particularly limited, and examples include, for example, acryloyl group, methacryloyl group, vinyl group, epoxy group, and so forth. Among these, acryloyl group and methacryloyl group are especially preferred.

In this embodiment, although number of the polymerizable reaction groups contained in the molecule of the isocyanuric acid derivative (A) is not particularly limited, the isocyanuric acid derivative (A) preferably has two or more polymerizable reaction groups in the molecule. If the isocyanuric acid derivative (A) has at least two polymerizable reaction groups in the molecule, crosslinking density is increased, and degradation of the hard coat property due to addition of the isocyanuric acid derivative (A) can be prevented.

In this embodiment, the isocyanuric acid derivative (A) has an alkylene oxide in the molecule. Appropriate hydrophilicity can be thereby imparted to the cured coated film, which contributes to improvement in the wiping-off property for fingerprints. In this embodiment, it is particularly preferred that the isocyanuric acid derivative (A) contains ethylene oxide (EO). If EO is contained, it is easier to impart appropriate hydrophilicity to the cured coated film compared with the cases where propylene oxide (PO), butylene oxide (BO) etc. are contained, which more contributes to improvement in the wiping-off property for fingerprints.

The isocyanuric acid derivative (A) used in this embodiment may have a unit derived from a closed ring structure (cyclo ring) in the molecule. Examples of the ring structure include lactones, lactams cycloolefins (for example, cyclopentene, cyclohexane, etc.), tetrahydrofuran, dioxane, silacyclopentene, cyclodecane, isobornyl, and so forth. For example, the unit derived from lactones is (—CO—O—(CH$_2$)$_n$) and the unit derived from lactams is (—NH—O—(CH$_2$)$_n$).

Although the lactones are not particularly limited, caprolactones are preferably used. The caprolactones are not also particularly limited, and examples include ε-caprolactone, δ-caprolactone, γ-caprolactone, and so forth. Among these, ε-caprolactone is preferred. Lactones other than caprolactones are also not particularly limited, and examples include δ-valerolactone, γ-butyrolactone, γ-valerolactone, β-propiolactone, and so forth. If the isocyanuric acid derivative (A) contains the unit derived from lactone, lactam, or the like in the molecule, appropriate lipophilicity can be imparted to the cured coated film, which contributes to improvement in the wiping-off property for fingerprints.

The isocyanuric acid derivative (A) used in this embodiment preferably has a molecular weight not smaller than 200 and not larger than 5000. If the molecular weight becomes unduly large, hard coat property of the cured coated film may be degraded. Conversely, if the molecular weight becomes unduly small, appropriate hydrophilicity and lipophilicity may not be imparted to the cured coated film. The molecular weight is obtained as a weight average molecular weight (Mw) measured by using polystyrene references with a mobile phase solvent such as tetrahydrofuran.

The isocyanuric acid derivative (A) used in this embodiment preferably has an HLB value not smaller than 10 and not larger than 18, more preferably larger than 12 and not larger than 15, as determined by the Griffin method. The HLB value determined by the Griffin method is calculated in accordance with the following equation.

HLB value=20×Total formula weight of hydrophilic portion/molecular weight [Equation 1]

The HLB (Hydrophile Lipophile Balance) value is an important index indicating characteristics of the isocyanuric acid derivative (A), and is a value indicating degree of hydrophilicity or lipophilicity. The HLB value is generally in the range of from 0 to 20, a value closer to 0 indicates higher lipophilicity, and a value closer to 20 indicates higher hydrophilicity.

If an isocyanuric acid derivative (A) of which HLB value is controlled to be within a predetermined range is used, hydrophilicity of the cured coated film is appropriately improved. As a result, it becomes easier to control the surface characteristics of the cured coated film to be within the range described later. Since fingerprints contain sweat, adhesion for moisture and wetting property are also important factors which affect the anti-fingerprint property. In order to obtain an effect of spreading fingerprints on the surface of the cured coated film with wetting the surface to make blemish of the fingerprints inconspicuous, it is more desirable that the coated film surface should have appropriate hydrophilicity.

In this embodiment, if the HLB value of the isocyanuric acid derivative (A) is unduly small, appropriate hydrophilicity may not be imparted to the cured coated film. Conversely, if the HLB value is unduly large, hydrophilicity becomes unduly strong, and wiping-off property for fingerprints is degraded.

The isocyanuric acid derivative (A) explained above is represented by, for example, the formula (1).

[Formula 1]

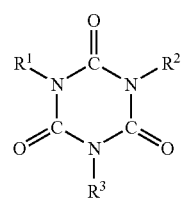

(1)

In the formula (1), R$^1$ is a monovalent substituent represented by the formula (2), R$^2$ is a monovalent substituent represented by the formula (3), and R$^3$ is a monovalent substituent represented by the formula (4).

[Formula 2]

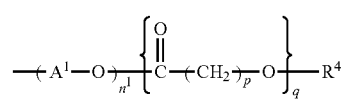

(2)

[Formula 3]

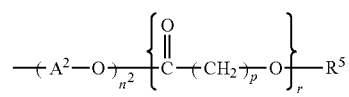

(3)

[Formula 4]

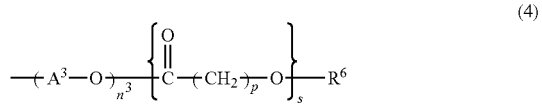

(4)

In the formulas (2) to (4), $A^1$, $A^2$ and $A^3$ each represent an alkylene group, preferably an alkylene group having 2 to 4 carbon atoms, more preferably ethylene group.

$R^4$, $R^5$ and $R^6$ represent a monovalent substituent represented by the formula (5). In the present invention, $A^1$, $A^2$ and $A^3$, and $R^4$, $R^5$ and $R^6$ in the same molecule may be the same or different.

$n^1$, $n^2$ and $n^3$ each represent a real number not larger than 3 (not including 0), preferably a real number of 0.5 to 1.5. If the values of $n^1$, $n^2$ and $n^3$ become larger, the wiping-off property for fingerprints tends to be degraded.

The total of $n^1$, $n^2$ and $n^3$ ($n^1+n^2+n^3$) is not larger than 5, preferably 2.0 to 4.0. If the value of ($n^1+n^2+n^3$) becomes larger, the wiping-off property for fingerprints tends to be further degraded.

p is an integer of 4 to 6. The groups may have a modified valerolactone group where p=4, a modified caprolactone group where p=5, or a modified enantolactone group where p=6. A modified caprolactone group where p=5 is especially preferred.

The symbols q, r and s preferably represent a real number of from 0 to 1.0, more preferably a real number of from 0.2 to 0.5. The total of q, r and s (q +r +s) is a real number of 0.5 to 3.0, preferably a real number of 0.5 to 2.0, more preferably a real number of 0.5 to 1.5. When the value of (q+r+s) becomes unduly large, balance of hydrophilicity and lipophilicity is degraded, and fingerprints tend to become conspicuous. Conversely, if the value of (q+r+s) is unduly small, the wiping-off property for fingerprints tends to be degraded.

In addition, q, r and s may simultaneously represent 0. That is, $R^1$, $R^2$ and $R^3$ in the formula (1) all may represent a substituent not having a modified lactone group selected from the modified valerolactone group (p=4), the modified caprolactone group (p=5), and the modified enantolactone group (p=6).

[Formula 5]

(5)

In the formula (5), $R^7$ represents hydrogen atom or methyl group, preferably hydrogen atom.

A preferred example of the isocyanuric acid derivative (A) represented by the formula (1) is tri(meth)Acrylate of 3 moles of ethylene oxide and 1 or 2 moles of ε-caprolactone adduct of isocyanuric acid, which is a compound of the formula (1) wherein $A^1$, $A^2$ and $A^3$ all represent ethylene group, $n^1$, $n^2$ and $n^3$ all represent 1.0, the total of $n^1$, $n^2$ and $n^3$ is 3.0, p is 5, the total of q, r and s is 1.0 or 2.0, and $R^7$ is a hydrogen atom or methyl group.

Although content (solid content) of the isocyanuric acid derivative (A) in the curable composition of this embodiment varies depending on types of other ingredients of the resin component, and thickness as the cured product, it is preferably 1 to 60% by weight, more preferably 5 to 40% by weight, still more preferably 10 to 20% by weight, based on the total resin component. If the content of (A) is unduly small, it tends to become difficult to impart appropriate hydrophilicity and lipophilicity to the cured coated film, and conversely, if the content of (A) becomes unduly large, the hard coat property of the cured coated film may become insufficient.

In this embodiment, photopolymerizable prepolymers (C) and other photopolymerizable monomers (B) can be used in combination with the isocyanuric acid derivative (A).

The photopolymerizable prepolymers (C) include those of cationic polymerization type and those of radical polymerization type.

As the radical polymerization type photopolymerizable prepolymers (C1), acrylic type prepolymers (hard prepolymers) which have two or more acryloyl groups in the molecule and forms a three-dimensional reticular structure by curing via crosslinking are particularly preferably used from the viewpoint of hard coat property.

Examples of the acrylic type prepolymers include urethane acrylates, polyester acrylates, epoxy acrylates, melamine acrylates, polyfluoroalkyl acrylates, silicone acrylates, and so forth.

The urethane acrylate type prepolymers can be obtained by, for example, esterifying a polyurethane oligomer, which is obtainable by a reaction of a polyether polyol or a polyester polyol and a polyisocyanate, by a reaction with a (meth) acrylic acid. The polyester acrylate type prepolymers can be obtained by, for example, esterifying hydroxyl group of a polyester oligomer having hydroxyl groups at both ends, which is obtainable by condensation of a polybasic carboxylic acid and a polyhydric alcohol, with (meth)acrylic acid, or by esterifying hydroxyl group at an end of an oligomer, which is obtainable by adding alkylene oxide to a polybasic carboxylic acid, with (meth)acrylic acid. The epoxy acrylate type prepolyners can be obtained by, for example, esterifying an oxirane ring of a bisphenol type epoxy resin or a novolak type epoxy resin having a relatively low molecular weight by a reaction with (meth)acrylic acid.

The acrylic type prepolymers can be suitably chosen according to type, use, etc. of a member as an object of application.

Examples of the cationic polymerization type photopolymerizable prepolymers (C2) include epoxy resins, vinyl ether resins, and so forth. Examples of the epoxy resins include, for example, bisphenol type epoxy resins, novolak type epoxy resins, alicyclic epoxy resins, aliphatic epoxy resins, and so forth.

In this embodiment, these photopolymerizable monomers (C) may be used independently, or as a combination of two or more kinds of them. Furthermore, in order to impart various performances, for example, to improve the property of curing by crosslinking, to control shrinkage upon curing, and so forth, it is preferable to add other photopolymerizable monomers (B).

Examples of the other photopolymerizable monomers (B) include monofunctional acrylic monomers (for example, 2-ethylhexyl acrylate, 2-hydroxyethyl acrylate, 2-hydroxypropyl acrylate, butoxyethyl acrylate etc.), bifunctional acrylic monomers (for example, 1,6-hexanediol diacrylate, neopentylglycol diacrylate, diethylene glycol diacrylate, polyethylene glycol diacrylate, neopentylglycol hydroxypivalate diacrylate etc.), and trifunctional acrylic monomers and those of further higher functionality (for example, dipentaerythritol hexaacrylate, trimethylpropane triacrylate, pentaerythritol triacrylate etc.). The "acrylate" not only literally includes acrylates, but also includes methacrylates. These photopolymerizable monomers (B) may be used independently, or as a combination of two or more kinds of them.

When the photopolymerizable prepolymers (C) and the other photopolymerizable monomers (B) are contained in the curable composition of this embodiment, total content (in terms of solid content) of the photopolymerizable prepolymers (C) and the other photopolymerizable monomers (B) based on the total resin component contained in the curable composition is preferably 40 to 99% by weight, more preferably 60 to 95% by weight, still more preferably 80 to 90% by weight.

Examples of the photopolymerization initiators (D1) contained in the ionizing radiation curable resin as required for the radical polymerization type photopolymerizable prepolymers and photopolymerizable monomers include, for example, acetophenone, benzophenone, Michler's ketone, benzoin, benzyl methyl ketal, benzoyl benzoate, α-acyl oxime ester, thioxansones, and so forth. Examples of the photopolymerization initiators for the cationic polymerization type photopolymerizable prepolymers include, for example, compounds formed from an onium such as aromatic sulfonium ions, aromatic oxosulfonium ions and aromatic iodonium ions, and an anion such as tetrafluoroborate, hexafluorophosphate, hexafluoroantimonate and hexafluoroarsenate. These may be used independently, or as a combination of two or more kinds of them.

When the photopolymerization initiator (D1) is contained in the curable composition of this embodiment, content of the photopolymerization initiator (D1) is usually selected to be within the range of 0.2 to 10 parts by weight based on 100 parts by weight of the total weight of the components (A), (B) and (C).

In this embodiment, when the aforementioned resin component is cured, the photopolymerization initiator (D1) and a compound which thermally generates active radical species (thermal polymerization initiator) can be used in combination, if needed. Examples of the thermal polymerization initiator (D2) include, for example, peroxides, azo compounds, and so forth. Specific examples include benzoyl peroxide, t-butyl peroxybenzoate, azobisisobutyronitrile, and so forth.

In this embodiment, together with the photopolymerization initiator (D1) and the thermal polymerization initiator (D2) added as required, a photopolymerization enhancer, an ultraviolet sensitizer, and so forth can also be used in combination. Examples of the photopolymerization enhancer include p-dimethylaminobenzoic acid isoamyl ester, p-dimethylaminobenzoic acid ethyl ester, and so forth. Examples of the ultraviolet sensitizer include n-butylamine, triethylamine, tri-n-butylphosphine, and so forth.

In this embodiment, the resin component may contain, besides the aforementioned thermosetting resin or ionizing radiation curable resin, other resins such as a thermoplastic resin to such an extent that the effect of the present invention should not be degraded.

The curable composition of this embodiment may optionally contain additive components (E) as required to such an extent that the effect of the present invention should not be degraded. Examples of the additive components (E) include, for example, surface regulators, lubricants, colorants, pigments, dyes, optical whitening agents, flame retardants, antibacterial agents, antifungal agents, ultraviolet absorbers, light stabilizers, heat stabilizers, antioxidants, plasticizers, leveling agents, flow regulators, antifoams, dispersing agents, storage stabilizers, crosslinking agents, and so forth.

In this embodiment, it is preferable to add, for example, a nonionic surfactant as a surface regulator or a leveling agent. In this embodiment, two or more kinds of nonionic surfactants may be added.

Nonionic surfactants that can be preferably used in this embodiment have an HLB value of, for example, 2 to 18, preferably 5 to 16, more preferably 5 to 15, as determined by the Griffin method. If a nonionic surfactant of which HLB value is appropriately controlled is added, the wiping-off property for fingerprints is improved. In particular, if a specific nonionic surfactant of which HLB value is controlled to be preferably 6 to 16, more preferably 8 to 15, still more preferably 8.5 to 15 (henceforth also referred to as "first nonionic surfactant"), is added, the wiping-off property for fingerprints is further improved. In this embodiment, it is more preferable to add a specific nonionic surfactant of which HLB value is controlled to be, for example, 5.5 to 9, preferably 6 to 8.5, as determined by the Griffin method (henceforth also referred to as "second nonionic surfactant") together with the first nonionic surfactant. By adding the second nonionic surfactant having an HLB value smaller than that of the first nonionic surfactant in combination, invisibility of adhered fingerprints is further improved without degrading the wiping-off property for fingerprints. Nonionic surfactant is a term for collectively referring to surfactants which do not show ionic property when they are dissolved in water, and they are constituted by a combination of a hydrophobic group (lipophilic group) and a hydrophilic group, like other surfactants.

Examples of such nonionic surfactants include, for example, fatty acid esters and polyethers. Examples of the fatty acid esters include fatty acid esters formed by condensation of a monohydric alcohol or a polyhydric alcohol of di- or higher hydricity and an aliphatic acid, for example, propylene glycol monostearate, propylene glycol monolaurate, diethylene glycol monostearate, diethylene glycol monolaurate, glycerol monostearate, sorbitan sesquioleate, sorbitan monooleate, sorbitan monostearate, sorbitan monopalmitate, sorbitan monolaurate, and so forth.

Examples of the fatty acid ester also include polyoxy alkylene-added fatty acid esters. In addition, known nonionic surfactants formed by addition polymerization of alkylene oxide on a known fatty acid ester may also be added, so long as a surfactant suitable for the nonionic surfactant is chosen. As the alkylene oxide to be addition-polymerized, ethylene oxide or propylene oxide is preferred. Ethylene oxide and propylene oxide may be independently addition-polymerized, or they may be addition-copolymerized. As the polyoxyalkylene-added fatty acid ester, known polyoxyalkylene-added fatty acid esters may be added so long as a polyoxyalkylene-added fatty acid ester suitable for the nonionic surfactant is chosen. Examples of the polyoxyalkylene-added fatty acid ester include, for example, polyoxyethylene hydrogenated castor oil, polyoxyethylene glycerin monostearate, polyoxyethylene (4) sorbitan monostearate, polyoxyethylene (20) sorbitan monostearate, polyoxyethylene (4) sorbitan tristearate, polyoxyethylene (5) sorbitan monooleate, polyoxyethylene (5) sorbitan monooleate, polyoxyethylene (20) sorbitan trioleate, polyoxyethylene (4) sorbitan monolaurate, polyoxyethylene glycol 400 monooleate, polyoxyethylene glycol 400 monostearate, polyethylene glycol 400 monolaurate, polyoxyethylene (4) sorbitan monolaurate, and so forth.

In this embodiment, as surfactants other than fatty acid ester or polyether, polyoxyethylene cholesteryl ethers, polyoxyethylene decyl tetradecyl ethers, and so forth may also be used. Further, as surfactants other than those mentioned above, surfactants having an alkylene oxide chain and an alkyl group can also be used. Examples of such surfactants include, for example polyoxyethylene lauryl ether, polyoxyethylene tridecyl ether, polyoxyethylene cetyl ether, polyoxyethylene stearyl ether, polyoxyethylene oleyl ether, polyoxyethylene nonylphenyl ether, polyoxyethylene octylphenyl ether, polyoxyethylene monolaurate, polyoxyethylene monostearate, polyoxyethylene monooleate, polyoxyethylene sorbitan monolaurate, polyoxyethylene sorbitan monopalmitate, polyoxyethylene sorbitan monostearate, polyoxyethylene sorbitan monooleate, and so forth. Among these, any of at least polyoxyethylene lauryl ether, polyoxyethylene oleyl ether, and polyoxyethylene monooleate is preferred.

In this embodiment, when a surfactant having an alkylene oxide chain and an alkyl group is used, molar number of alkylene oxide (especially ethylene oxide) contained in the molecule thereof is 1 to 5.5, preferably 2 to 4.5. Further, when a surfactant having an alkylene oxide chain and an alkyl group is used, HLB value thereof as determined by the Griffin method is 5.5 to 9, preferably 6 to 8.5. If a specific surfactant of which HLB value, molar number of alkylene oxide etc. are appropriately controlled is used, the surface becomes likely to show affinity for oils in fingerprints without degrading the wiping-off property for fingerprints, and thus further improvement in invisibility of adhered fingerprints can be expected.

When a nonionic surfactant is added to the curable composition of this embodiment, content of the nonionic surfactant (when two or more kinds of surfactants are added, it is the total content) is preferably 0.05 part by weight or more, more preferably 1 part by weight or more, and preferably 15 parts by weight or less, more preferably 10 parts by weight or less, based on 100 parts by weight of the resin component. If the content of the surfactant is unduly small, effect of the addition is not obtained, and conversely, if the content is unduly large, the hard coat property of the cured coated film may be degraded, and bleeding of the surfactant even around the surface of the coated film may invite whitening of the coated film surface. If the surfactant is added in an optimum amount, further improvement in the wiping-off property for fingerprints of cured product to be obtained is expected.

The curable composition of this embodiment is usually realized in the form of a coating material. When it is formed as an organic solvent type coating material, a curable composition can be produced by dissolving or dispersing the resin component mentioned above (and an additive component as required) with a dilution solvent such as an organic solvent, which can be suitably chosen according to the type of the resin component, and adding an additive as required. Although the organic solvent is not particularly limited, examples include alcohols (for example, methanol, ethanol, isopropanol, butanol, octanol etc.), ketones (for example, acetone, methyl ethyl ketone (MEK), methyl isobutyl ketone, cyclohexanone etc.), esters (for example, ethyl acetate, butyl acetate, ethyl lactate, γ-butyrolactoner propylene glycol monomethyl ether acetate, propylene glycol monoethyl ether acetate etc.), ethers (for example, ethylene glycol monomethyl ether, diethylene glycol monobutyl ether etc.), aromatic hydrocarbons (for example, benzene, toluene, xylene etc.), and amides (for example, dimethylformamide, N,N-dimethylacetamide, N-methylpyrrolidone etc.). When the curable composition is formed as a solventless coating material, a curable composition can be formed by adding an additive component to the resin component mentioned above as required.

<<Cured Product>>

The cured product of this embodiment can be obtained by applying the curable composition mentioned above to a desired object of application and curing the composition.

The object of application is a base material to which hard coat property (scratch resistance) and effect of improvement in adhered fingerprint invisibility are desired to be imparted. Shape of the base material used for this embodiment is not particularly limited, and the base material may have any shape having an arbitrary thickness such as shapes of film, sheet and plate. Further, the base material may have, for example, an uneven surface, or the base material may have a three-dimensional shape having a three-dimensionally curved surface.

Material of the base material is not also particularly limited. Although it may be a hard base material such as glass plates, it is preferably a resin base material having flexibility in this embodiment. Type of the resin which constitutes the resin base material is not particularly limited. Examples of the resin for forming the resin base material in the shape of, for example, film or sheet include, for example, acrylic resin, polycarbonate, polyvinyl chloride, polyester, polypropylene, polyethylene, acetyl cellulose, cycloolefin, and so forth. Examples of the resin for forming the resin base material in the shape of plate include, for example, acrylic resin, polycarbonate, polyvinyl chloride, and so forth.

In this embodiment, surface of the base material may be subjected to an adhesion promoting treatment in order to improve adhesion of the base material with the cured product. Examples of the adhesion promoting treatment include, for example, plasma treatment, corona discharge treatment, far ultraviolet ray irradiation treatment, formation of adhesion promoting undercoat layer, and so forth.

In addition, the base material may contain additives similar to the additives that can be contained in the curable composition of this embodiment such as pigments and ultraviolet absorbers to such an extent that the effect of the present invention should not be degraded.

Application (coating) of the curable composition to an object of application may be performed by a conventional method such as bar coating, die coating, blade coating, spin coating, roll coating, photogravure coating, flow coating, dip coating, spray coating, screen printing and brush coating.

In this embodiment, the curable composition is applied so that the applied coated film should preferably have a thickness not smaller than about 0.1 μm and not larger than about 30 μm after drying and curing described later. After the curable composition is applied to an object of application, the applied coated film is preferably dried at about 50 to 120° C.

Curing of the curable composition can be attained by subjecting the applied coated film to thermal curing and/or irradiation of ionizing radiation (light).

When thermal curing is performed, for example, an electric heater, an infrared lamp, hot wind, and so forth can be used as the heat source.

When curing is attained by using ionizing radiation (light), the source of radiation is not particularly limited, so long as the curable composition applied on the base material can be cured in a short time. For example, examples of infrared radiation source include lamps, resistance heating boards, lasers, and so forth. Examples of visible light source include sunlight, lamps, fluorescent lights, lasers, and so forth. Examples of ultraviolet ray (ionizing radiation) source include ultrahigh pressure mercury lamps, high pressure mercury lamps, low pressure mercury lamps, carbon arc, metal halide lamps, and so forth. Ultraviolet rays in a wavelength region of 100 to 400 nm, preferably 200 to 400 nm, emitted from such ultraviolet ray sources as mentioned above are irradiated. Examples of electron beam (ionizing radiation) source include electron beam accelerators of scanning type, curtain type, etc. Electron beams in a wavelength region of 100 nm or smaller emitted from such electron beam accelerators as mentioned above are irradiated.

Irradiation dose of ionizing radiation changes depending on type of the ionizing radiation. For example, in the case of ultraviolet ray, the dose is preferably about 100 to 500 mJ/cm$^2$ as an amount of light, and in the case of electron beam, the dose is preferably about 10 to 1000 krad.

<<Laminate>>

As shown in FIG. 1, the laminate of this embodiment comprises a hard coat layer 1 laminated on the surface of object of application (not shown). The hard coat layer 1 consists of a cured product of the curable composition of this embodiment.

Since the hard coat layer 1 of this embodiment is constituted by a cured product of the curable composition containing the specific isocyanuric acid derivative (A) mentioned above, the surface properties thereof are appropriately controlled. Specifically, the hard coat layer 1 of this embodiment is preferably controlled to show large contact angle for water, small contact angle for camellia oil, and wet tension within a predetermined range.

In this embodiment, contact angle for water of the hard coat layer 1 is preferably controlled to be 50° or larger, more preferably 70° or larger, still more preferably 80° or larger, particularly preferably 80° or larger. If the contact angle for water is controlled to be 50° or larger, the contact area with water becomes small. As a result, aqueous component contained in fingerprints more easily separates, and the wiping-off property for fingerprints is improved.

In this embodiment, contact angle for water of the hard coat layer 1 is preferably controlled to be 110° or smaller, more preferably 100° or smaller. If the contact angle for water is controlled to be 110° or smaller, the contact area with water is not become unduly small, and adhered fingerprints can be made inconspicuous (improvement in invisibility of adhered fingerprints). By controlling contact angle for water of the hard coat layer 1 to be within a predetermined range, in addition to the improvement in invisibility of adhered fingerprints, enhancement of wiping-off property for fingerprints can also be attained.

In this embodiment, contact angle for camellia oil of the hard coat layer 1 is preferably controlled to be 50° or smaller, more preferably 40° or smaller. If the contact angle for camellia oil is controlled to be 50° or smaller, oil component contained in fingerprints spreads with wetting the surface. Therefore, adhered fingerprints become inconspicuous (improvement in invisibility of adhered fingerprints), and fingerprint components remaining after wiping can also be made inconspicuous.

Both of values of the contact angle for water and contact angle for camellia oil are values measured by the method according to JIS-R3257 (1999).

In this embodiment, wet tension of the hard coat layer 1 is preferably controlled to be 27 mN/m or larger, more preferably 30 mN/m or larger. Wet tension of the hard coat layer 1 is also preferably controlled to be 45 mN/m or smaller, more preferably 40 mN/m or smaller, still more preferably 38 mN/m or smaller.

The inventors of the present invention found that wet tension of the cured hard coat layer 1 to be formed could be controlled to be within a prescribed range by using the specific isocyanuric acid derivative (A) mentioned above, and as a result, the wiping-off property for fingerprints could be improved. Although the reason why such an effect is obtained is not necessarily clear, it can be assumingly considered as follows. When wet tension of the hard coat layer 1 is controlled to be within the predetermined range, aqueous component 2 in fingerprints is more likely to show appropriate affinity to the surface of the hard coat layer 1, and the aqueous component 2 and the oil component 3 will exist on the hard coat layer 1 in an appropriately mixed state. That is, since much of aqueous component 2 will be present on the hard coat layer 1, the oil component 3 becomes hard to remain on the surface of the hard coat layer 1 when the fingerprint components are wiped off. And since some oil component 3 will remain on the surface of the hard coat layer 1, degree of hydrophilicity of the surface of the hard coat layer 1 does not become unduly high. As a result, the aqueous component 2 may be prevented from becoming hard to be separated from the surface of the hard coat layer 1, and the wiping-off property for fingerprints may be improved.

Figure 2:
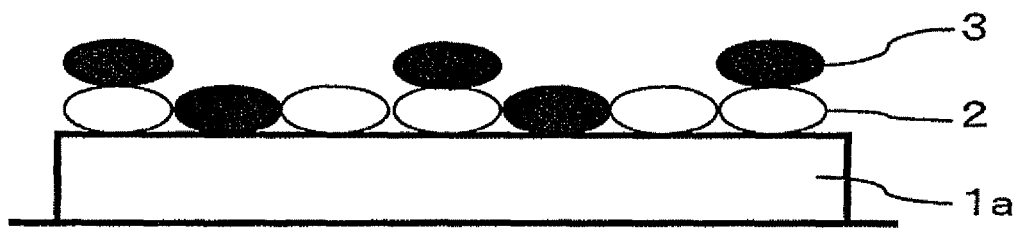
FIG. 2 is a conceptual drawing for explaining surface conditions of a hard coat layer of which wet tension is too low.

On the other hand, if wet tension of the hard coat layer 1a is unduly low as shown in FIG. 2, the oil component 3 contained in fingerprints may show affinity to the surface in a degree as high as that of the aqueous component 2, and therefore too much oil component 3 is present on the surface of the hard coat layer 1a. As a result, even after wiping off the fingerprints, it may become more likely that the oil component 3 remains on the surface of the hard coat layer 1a, and thus the wiping-off property for fingerprints may be degraded.

Figure 3:
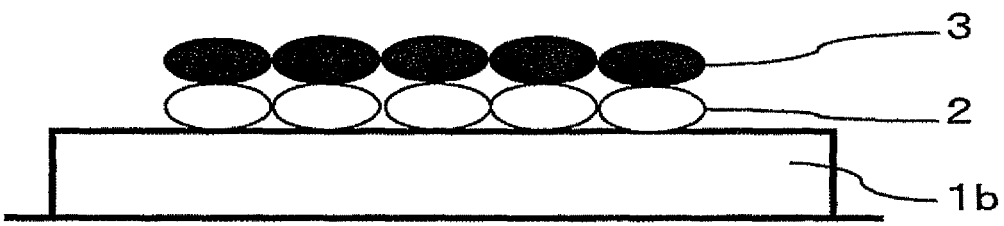
FIG. 3 is a conceptual drawing for explaining surface conditions of a hard coat layer of which wet tension is too high.

Moreover, if wet tension of the hard coat layer 1b is unduly high as shown in FIG. 3, the aqueous component 2 of fingerprints comes to show higher affinity compared with the oil component 3, and degree of hydrophilicity of the surface of the hard coat layer 1b becomes unduly high. As a result, the aqueous component 2 present on the surface of the hard coat layer 1b becomes hard to be separated from the surface of the hard coat layer 1b, and thus the wiping-off property for fingerprints may be degraded.

The values of wet tension are values measured by the method according to JIS-K6768 (1999).

In FIG. 1 again, pencil scratch value of the hard coat layer 1 of this embodiment is preferably controlled to be H or higher, more preferably 2 H or higher. By controlling the pencil scratch value to be not lower than a predetermined value, scratch on the surface of the hard coat layer 1 can be effectively prevented without degrading improvement in invisibility of adhered fingerprints nor fingerprint wiping-off property.

The values of pencil scratch value are values measured by the method according to JIS-K 5600-5-4 (1999).

The hard coat layer 1 of this embodiment is preferably further controlled to have a refractive index value of 1.45 to 1.65, more preferably 1.46 to 1.52. By controlling the value of refractive index to be within a predetermined range, difference of the refractive index of the hard coat layer 1 and the refractive index of fingerprint components can be made small. As a result, even when fingerprints are adhered on the hard coat film 1, the adhered fingerprints are more inconspicuous (further improvement in invisibility of adhered fingerprints), and fingerprint components after wiping can also be made inconspicuous.

The hard coat layer 1 of this embodiment preferably has a thickness not smaller than about 0.1 μm and not larger than about 30 μm. With a thickness not smaller than 0.1 μm, the hard coat layer 1 can be made a coated film having sufficient hardness. On the other hand, even if the thickness of the hard coat film 1 is made larger than 30 μm, hardness of the coated film is not further improved. Moreover, when the thickness of the hard coat film 1 becomes larger, it tends to cause curling due to shrinkage of the coated film. Therefore, a thickness of 30 μm or smaller is preferred from the viewpoints of economy and anti-curling property.

In this embodiment, it is also possible to make the hard coated layer 1 as a thin film having a thickness of about 10 μm or smaller, or a further thinner film having a thickness of about 5 μm or smaller. Even as such a thin film, the necessary performances can be obtained at sufficient levels.

In addition, in this embodiment, the surface of the hard coat layer 1 may be further subjected to a surface treatment, such as plasma treatment, corona discharge treatment and far ultraviolet ray irradiation treatment, in order to obtain the aforementioned surface properties.

The hard coat layer 1 of this embodiment shown in FIG. 1 is used for uses which require impartation of hard coat property (scratch resistance) and effect of improvement in adhered fingerprint invisibility, in particular, as hard coat layers suitable for surface protection of various displays (for example, plasma display panel (PDP), cathode ray tube (CRT), liquid crystal display (LCD), electroluminescence display (ELD), field emission display (FED), etc.); glass for showcases, cover glass of watches and gauges; windowpanes of architectural structures (public facilities, common houses, buildings, etc.), and various vehicles (cars, rapid transit railway (Shinkansen) trains, electric trains, etc.); touching surfaces of touch panel type electronic equipments, of which typical examples are ATMs in banks and ticket machines, and so forth.

The electronic equipments of course include information processing devices having such various displays as mentioned above, such as cellular phones (including, for example, portable personal information terminals having PDA (Personal Digital Assistants) functions) and personal computers.

As conventional means for preventing scratches, hard coat layers (films) are provided directly on surfaces of various displays (including touch panels), or hard coat films formed by providing a hard coat layer on a transparent base material are adhered to them. Since the hard coat layers and hard coat films used for such uses are highly transparent, when fingerprints are adhered on the hard coat layers, they are very conspicuous, and the hard coat layers cannot be made clean even if they are wiped with cloth or the like.

According to this embodiment, by adding the specific isocyanuric acid derivative (A) to the curable composition, which is a component for forming a hard coat layer, appropriate hydrophilicity and lipophilicity can be imparted to surface of the cured coated film (cured product, hard coat layer), degree of contact of fingerprint components with the coated film surface does not become unduly small, and thus the fingerprint components can be spread on the coated film surface with wetting the surface. As a result, even when fingerprints are adhered to the surface of the cured coated film, the adhered fingerprints can be made inconspicuous. In this embodiment, degradation of the hard coat property of the cured coated film can also be prevented. According to this embodiment, wiping-off property for adhered fingerprints is also made favorable, and fingerprint components remaining after wiping can also be made inconspicuous.

EXAMPLES

Hereafter, the present invention will be explained in more detail with reference to examples in which embodiments of the present invention are more specifically realized. However, the present invention is not limited to these examples. In the examples, the term "part" and the symbol "%" are used on weight basis unless especially specified.

Experimental Example 1

First, a coating solution (curable composition) was prepared.

| <Composition of coating solution> | |
|---|---|
| Ionizing radiation curable resin composition (solid content: 100%, Beamset 575, Arakawa Chemical Industries, Ltd.) | 17 parts |
| Triacrylate of 3-mole ethylene oxide and 2-mole ε-caprolactone adduct of isocyanuric acid (solid content: 100%, Mw: about 700, HLB value: 14, NK Ester A-9300, Shin-Nakamura Chemical Co., Ltd.) (corresponding to 15% of the total resin components) | 3 parts |
| Photopolymerization initiator (Irgacure 651, Ciba Speciality Chemicals Inc.) | 0.4 part |
| Propylene glycol monomethyl ether | 30 parts |

Then, the prepared coating solution was applied to one surface of a polyester film having a thickness 125 μm (COSMOSHINE A4300, Toyobo Co., Ltd.) as an object of application by bar coating method, and dried to form a coated film.

Then, the formed coated film was irradiated with ultraviolet ray emitted from a high pressure mercury lamp (irradiation dose: 400 mJ/cm$^2$) to obtain a sample of a laminate having a hard coat layer having a thickness of 6 μm.

Contact angle for water, contact angle for camellia oil, and wet tension of the obtained laminate sample were measured according to the following methods, and the sample was evaluated for adhered fingerprint invisibility, fingerprint wiping-off property and pencil hardness. The results are shown in Table 1.

(1) Both of contact angle for water and contact angle for camellia oil were measured on the hard coat layer of the laminate sample according to the method of JIS-R3257 (1999).
(2) Wet tension was measured on the hard coat layer of the laminate sample according to the method of JIS-K6768 (1999).
(3) Adhered fingerprint invisibility was evaluated as follows. First, inside of a finger was pressed against the surface of the hard coat layer of the laminate sample to adhere a fingerprint. Then, the laminate sample adhered with the fingerprint was put on a black material so that the side of the member as the object of application of the laminate sample should face the black material. Then, the fingerprint was observed from right above on the hard coat layer side of the laminate sample under illumination with a three band fluorescent light. The evaluation results are shown with "⊙⊙" when the fingerprint components could not be seen from right above, and could not be substantially seen from oblique directions, with "⊙" when the fingerprint could not be seen, with "○" when the fingerprint was hardly seen, with "Δ" when the fingerprint could be slightly seen, or with "×" when the fingerprint was clearly seen.
(4) Fingerprint wiping-off property was evaluated as follows. First, inside of a finger was pressed against the surface of the hard coat layer of the laminate sample to adhere a fingerprint. Then, paper tissue (Kleenex, Nippon Paper Crecia Co., Ltd.) was contacted with the hard coat layer adhered with the fingerprint, and reciprocally moved to wipe off the fingerprint. Then, the laminate sample adhered with the fingerprint was put on a black material so that the side of the member as the object of application of the laminate sample should face the black material. Then, the laminate sample was obliquely observed from the hard coat layer side under illumination with a three band fluorescent light to examine the condition of the hard coat layer after wiping off of the fingerprint. The evaluation results are shown with "⊚" when less than two times of the reciprocal movements were required to make the fingerprint invisible, with "○" when not less than two times but less than three times of the reciprocal movements were required to make the fingerprint invisible, with "Δ" when not less than three times but less than five times of the reciprocal movements were required to make the fingerprint invisible, or with "×" when not less than five times of the reciprocal movements were required to make the fingerprint invisible, or the fingerprint could not be made invisible.

(5) As for pencil hardness, pencil scratch value of the hard coat layer surface of the laminate sample was measured by the method according to JIS-K 5600-5-4 (1999). The evaluation results are shown with "⊚" when the measured value was 2 H or higher, with "○" when the measured value was H, or with "×" when the measured value was lower than H.

Experimental Example 2

A coating solution was prepared, and a laminate sample was obtained in the same manner as that of Experimental Example 1, except that an isocyanuric acid derivative having an Mw of about 400 (solid content: 100%, HLB value: 12, trade name: SR368, Sartomer Co., Inc.) was used instead of NK Ester A9300. Then, the same measurements and evaluations as those of Experimental Example 1 were performed. The results are shown in Table 1.

Experimental Example 3

A coating solution was prepared, and a laminate sample was obtained in the same manner as that of Experimental Example 1, except that 0.5 part of a nonionc surfactant (polyether, HLB value: 13, trade name: EMULMIN 110, Sanyo Chemical Industries, Ltd.) was added as a surface regulator. Then, the same measurements and evaluations as those of Experimental Example 1 were performed. The results are shown in Table 1.

Experimental Example 4

A coating solution was prepared, and a laminate sample was obtained in the same manner as that of Experimental Example 1, except that the amount of NK Ester A9300 was changed to 65% based on the total resin component, and EMULMIN 110, which was used in Experimental Example 3, was added in the same amount. Then, the same measurements and evaluations as those of Experimental Example 1 were performed. The results are shown in Table 1.

Experimental Example 5

A coating solution was prepared, and a laminate sample was obtained in the same manner as that of Experimental Example 1, except that the amount of NK Ester A9300 was changed to 0.8% based on the total resin component, and EMULMIN 110, which was used in Experimental Example 3, was added in the same amount, like Experimental Example 4. Then, the same measurements and evaluations as those of Experimental Example 1 were performed. The results are shown in Table 1.

Experimental Example 6

A coating solution was prepared, and a laminate sample was obtained in the same manner as that of Experimental Example 3, except that a nonionic surfactant (polyether, HLB value: 6, trade name: PELETEX PC-2419, Miyoshi Oil & Fat Co., Ltd.) was used as a surface regulator instead of EMULMIN 110. Then, the same measurements and evaluations as those of Experimental Example 1 were performed. The results are shown in Table 1.

Experimental Example 7

A coating solution was prepared, and a laminate sample was obtained in the same manner as that of Experimental Example 3, except that a nonionic surfactant (fatty acid ester, HLB value: 16, trade name: NK Ester A-GLY-20E, Shin-Nakamura Chemical Co., Ltd.) was used as a surface regulator instead of EMULMIN 110. Then, the same measurements and evaluations as those of Experimental Example 1 were performed. The results are shown in Table 1.

Experimental Example 8

A coating solution was prepared, and a laminate sample was obtained in the same manner as that of Experimental Example 1, except that 5 parts of polyethylene glycol diacrylate (solid content: 100%, Mw: about 1100, HLB value: 17, NK Ester A-1000, Shin-Nakamura Chemical Co., Ltd.), which does not fall into the scope of the isocyanuric acid derivative (A) of the present invention, was added instead of NK Ester A9300, 0.05 part of a nonionic surfactant (polyether-modified dimethylpolysiloxane, solid content: 100%, trade name: BYK331, BYK Japan KK) was added as a surface regulator, the amount of Beamset 575 was changed to 10 parts, the amount of Irgacure 651 was changed to 0.5 part, and the amount of propylene glycol methyl ether was changed to 23 parts. Then, the same measurements and evaluations as those of Experimental Example 1 were performed. The results are shown in Table 1.

Experimental Example 9

A coating solution was prepared, and a laminate sample was obtained in the same manner as that of Experimental Example 3, except that 0.5 part of a nonionic surfactant (polyoxyethylene monooleate, molar number of ethylene oxide: 4.5, HLB value: 8.4, trade name: BLAUNON O-200SA, Aoki Oil Industrial Co., Ltd.) was added as a surface regulator together with 0.5 part of EMULMIN 110. Then, the same measurements and evaluations as those of Experimental Example 1 were performed. The results are shown in Table 1.

Experimental Example 10

A coating solution was prepared, and a laminate sample was obtained in the same manner as that of Experimental Example 3, except that 0.5 part of a nonionic surfactant (polyoxyethylene lauryl ether, molar number of ethylene oxide: 2.2, HLB value: 6.3, trade name: BLAUNON EL-1502.2, Aoki Oil Industrial Co., Ltd.) was added as a surface regulator together with 0.5 part of EMULMIN 110. Then, the same measurements and evaluations as those of Experimental Example 1 were performed. The results are shown in Table 1.

Experimental Example 11

A coating solution was prepared, and a laminate sample was obtained in the same manner as that of Experimental Example 3, 0.5 part of a nonionic surfactant (polyoxyethylene oleoyl ether, molar number of ethylene oxide: 5, HLB value: 9, trade name: Nonion E-205S, NOF Corporation) was added as a surface regulator together with 0.5 part of EMULMIN 110. Then, the same measurements and evaluations as those of Experimental Example 1 were performed. The results are shown in Table 1.

degrading appropriate balance between hydrophilicity and lipophilicity of the hard coat layer, as in Experimental Examples 1 and 2. In addition, the fingerprint wiping-off property was further improved.

Moreover, it could be confirmed that even if the leveling agent was changed (Experimental Examples 6, 7, 9 to 11), the same effect could be obtained. In particular, it could be confirmed that if, together with the surfactant added in Experimental Example 3 (first nonionic surfactant), a specific surfactant showing an HLB value lower than that of the foregoing surfactant (second nonionic surfactant) was further added (Experimental Examples 9 to 11), an effect of further improving the fingerprint invisibility could be obtained without degrading the fingerprint wiping-off property.

TABLE 1

| | Isocyanuric acid derivative (A) | | | | | | Surface characteristics | | | Evaluation | | |
|---|---|---|---|---|---|---|---|---|---|---|---|---|
| | | | | | | | | Contact angle for camellia oil (degree) | | | Finger-print wiping-off property | |
| | Polymerizable reaction group | Alkylene oxide | Cyclo ring | | HLB value | Content based on total resin component (weight %) | Contact angle for water (degree) | | Wet tension (mN/m) | Finger-print invisibility | | Pencil hardness |
| | Type | Number | Type | Type | Mw | | | | | | | |
| Experimental Example 1 | Acryloyl group | 3 | EO | ε-caprolactone | about 700 | 14 | 15 | 68 | 24 | 44 | ◎ | ○ | ◎ |
| Experimental Example 2 | | | | None | about 400 | 12 | | 63 | 25 | 45 | ◎ | ○ | ◎ |
| Experimental Example 3 | | | | ε-caprolactone | about 700 | 14 | | 77 | 33 | 32 | ◎ | ◎ | ◎ |
| Experimental Example 4 | | | | | | | 65 | 72 | 35 | 33 | ◎ | ◎ | ○ |
| Experimental Example 5 | | | | | | | 0.8 | 76 | 32 | 33 | ○ | ○ | ◎ |
| Experimental Example 6 | | | | | | | 15 | 63 | 37 | 37 | ◎ | ◎ | ◎ |
| Experimental Example 7 | | | | | | | | 68 | 25 | 42 | ◎ | ◎ | ◎ |
| Experimental Example 8 | | | | None | | | | 112 | 65 | 18 | X | X | ◎ |
| Experimental Example 9 | Acryloyl group | 3 | EO | ε-caprolactone | about 700 | 14 | 15 | 67 | 32 | 33 | ◎◎ | ◎ | ◎ |
| Experimental Example 10 | | | | | | | | 73 | 31 | 34 | ◎◎ | ◎ | ◎ |
| Experimental Example 11 | | | | | | | | 69 | 31 | 34 | ◎◎ | ◎ | ◎ |

As seen from the results shown in Table 1, it could be confirmed that if the amount of NK Ester A9300 was large (Experimental Example 4), the hard coat property of the hard coat layer was degraded. It could also be confirmed that, on the other hand, if the amount of NK Ester A9300 was small (Experimental Example 5), appropriate balance between hydrophilicity and lipophilicity of the hard coat layer was degraded. Moreover, it was confirmed that if NK Ester A9300 was not added (Experimental Example 8), appropriate balance between hydrophilicity and lipophilicity of the hard coat layer was more markedly degraded compared with Experimental Example 5, and both the fingerprint invisibility and fingerprint wiping-off property became inferior.

It could be confirmed that, on the other hand, if the molecular weight and amount of the isocyanuric acid derivative (A) were appropriate (Experimental Examples 1 and 2), degradation of the hard coat property was prevented without degrading appropriate balance between hydrophilicity and lipophilicity of the hard coat layer.

It could be confirmed that if a nonionic surfactant was added as a leveling agent (Experimental Example 3), degradation of the hard coat property was prevented without

The invention claimed is:

1. A curable composition for forming a cured coated film which is improved in invisibility of adhered fingerprints comprising:
    a curable resin and a first and a second nonionic surfactant, wherein:
    the curable resin contains reactive monomers, the reactive monomers including an isocyanuric acid derivative having, in its molecule, a polymerizable reactive group, an alkylene oxide chain and an unit derived from a cyclo ring structure and having a HLB value in the range of 10 to 18 as determined by the Griffin method;
    the first nonionic surfactant has a HLB value in the range of 13-15; and
    the second nonionic surfactant has a HLB value in the range of 5.5-9.0; and having, in its molecule, an alkylene oxide chain and an alkyl group.

2. The curable composition according to claim 1, wherein:
    the isocyanuric acid derivative has a weight average molecular weight of 200 to 5000.

3. The curable composition according to claim 1, wherein:
the second nonionic surfactant has an alkylene oxide chain in its molecule with a molar number of alkylene oxides of 1 to 5.5.

4. The curable composition according to claim 1, wherein:
the second nonionic surfactant contains at least one of polyoxyethylene lauryl ether, polyoxyethylene oleyr ether, and polyoxyethylene monooleate.

5. The curable composition according to claim 1, wherein:
the first nonionic surfactant contains fatty acid esters or polyethers.

6. The curable composition according to claim 1, wherein:
the polymerizable reactive group is selected from the group consisting of an acryloyl group, a methacryloyl group, a vinyl group and an epoxy group,
the unit derived from the cyclo ring structure is derived from a compound selected from the group consisting of lactones, lactams, cycloolefins, tetrahydrofuran, dioxane, silacyclopentene, cyclodecane and isobornyl,
the isocyanuric acid derivative contains 1 or 2 moles of an adduct of the cyclo ring compound and isocyanuric acid per 3 moles of the alkylene oxide, and
the content of the isocyanuric acid derivative is 1 to 20% by weight in terms of solids content of the total curable resin.

7. The curable composition according to claim 1, wherein:
the isocyanuric acid derivative is represented by the following formula (1):

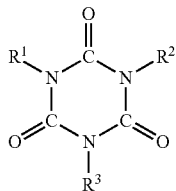

(1)

wherein $R^1$, $R^2$ and $R^3$ represent monovalent substituents represented by the formulas (2), (3) and (4), respectively:

[Formula 2]

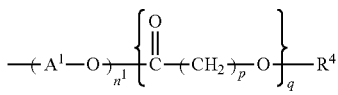

(2)

[Formula 3]

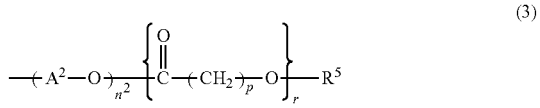

(3)

[Formula 4]

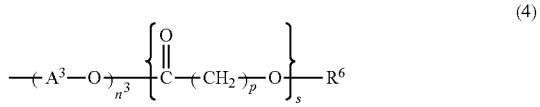

(4)

wherein $A^1$, $A^2$ and $A^3$ represent an alkylene group, $R^4$, $R^5$ and $R^6$ represent a monovalent substituent represented by the formula (5), $n^1$, $n^2$ and $n^3$ each represent a real number not larger than 3, the total of $n^1$, $n^2$ and $n^3$ is not larger than 5 (not including 0), p is an integer of 4 to 6, and the total of q, r and s is a real number of 0.5 to 2.0:

(5)

wherein $R^7$ represents a hydrogen atom or methyl group.

8. The curable composition according to claim 1, wherein:
the isocyanuric acid derivative is a tri(meth)acrylate of an ethylene oxide and an ε-caprolactone adduct of isocyanuric acid.

9. An electronic device having a cured product as a hard coat layer, wherein the cured product is obtained by irradiating an applied coated film with ultraviolet ray at 100 to 500 mJ/cm$^2$ or electron beam at 10 to 1000 krad as an amount of light, and the applied coated film is obtained by applying the curable composition according to claim 1 to an object of application and drying at 50 to 120° C.

10. A laminate having a cured product as a hard coat layer, wherein the cured product is obtained by irradiating an applied coated film with ultraviolet ray at 100 to 500 mJ/cm$^2$ or electron beam at 10 to 1000 krad as an amount of light, and the applied coated film is obtained by applying the curable composition according to claim 1 to an object of application and drying at 50 to 120° C.

* * * * *